US011483129B2

(12) United States Patent
Zhang et al.

(10) Patent No.: US 11,483,129 B2
(45) Date of Patent: Oct. 25, 2022

(54) METHOD AND APPARATUS FOR REACHING BLOCKCHAIN CONSENSUS

(71) Applicant: HEFEI DAPPWORKS TECHNOLOGY CO., LTD., Anhui (CN)

(72) Inventors: Yan Zhang, Anhui (CN); Yi Shi, Anhui (CN)

(73) Assignee: HEFEI DAPPWORKS TECHNOLOGY CO., LTD., Anhui (CN)

( * ) Notice: Subject to any disclaimer, the term of this patent is extended or adjusted under 35 U.S.C. 154(b) by 48 days.

(21) Appl. No.: 17/053,171

(22) PCT Filed: May 9, 2018

(86) PCT No.: PCT/CN2018/086154
§ 371 (c)(1),
(2) Date: Nov. 5, 2020

(87) PCT Pub. No.: WO2019/213867
PCT Pub. Date: Nov. 14, 2019

(65) Prior Publication Data
US 2021/0167942 A1  Jun. 3, 2021

(51) Int. Cl.
*H04L 9/06* (2006.01)
*H04L 9/08* (2006.01)
*H04L 9/00* (2022.01)

(52) U.S. Cl.
CPC .......... *H04L 9/0618* (2013.01); *H04L 9/0869* (2013.01); *H04L 9/50* (2022.05); *H04L 2209/463* (2013.01)

(58) Field of Classification Search
CPC . H04L 9/0618; H04L 9/0869; H04L 2209/38; H04L 2209/463; H04L 9/3239;
(Continued)

(56) References Cited

U.S. PATENT DOCUMENTS 9,875,510 B1   1/2018 Kasper
2016/0284033 A1*  9/2016 Winand ................ H04L 9/0637
(Continued)

FOREIGN PATENT DOCUMENTS

CN   106060036   10/2016
CN   107341660   11/2017
(Continued)

OTHER PUBLICATIONS

Extended European Search Report issued in corresponding European Patent Application No. 18918012.8, dated Nov. 5, 2021.
(Continued)

*Primary Examiner* — Quazi Farooqui
(74) *Attorney, Agent, or Firm* — Pillsbury Winthrop Shaw Pittman LLP

(57) ABSTRACT

The present disclosure provides a blockchain consensus reaching method, includes: receiving election data transmitted from a blockchain node having a first account balance and/or a second account balance, the election data comprises information about a blockchain node selected by the blockchain node that transmits the election data; and determining a consensus blockchain node from blockchain nodes selected by each election data based on the election data received in this round, so that the determined consensus blockchain node performs a block packaging operation in a new round; wherein a value in the first account of each blockchain node indicates a number of digital currencies that the blockchain node has, and a value in the second account of each blockchain node indicates a number of votes that the blockchain node has. The present disclosure also provides a blockchain consensus reaching apparatus, a computer system and a computer-readable medium.

13 Claims, 3 Drawing Sheets

(58) Field of Classification Search
CPC .......... H04L 9/06; H04L 9/08; G06Q 20/065; G06Q 20/223; G06Q 20/3678; G06Q 20/3827; G06Q 20/3829; G06Q 20/389; G06Q 20/4016; G06Q 20/02; G06Q 20/401

See application file for complete search history.

(56) References Cited

U.S. PATENT DOCUMENTS

| | | | |
|---|---|---|---|
| 2017/0323392 A1 | 11/2017 | Kasper et al. | |
| 2019/0213821 A1* | 7/2019 | Davis | H04L 9/3239 |
| 2019/0349426 A1* | 11/2019 | Smith | H04L 9/3239 |
| 2020/0059369 A1* | 2/2020 | Li | H04L 9/3247 |
| 2021/0200750 A1 | 7/2021 | Zhang et al. | |
| 2021/0233673 A1 | 7/2021 | Zhang et al. | |

FOREIGN PATENT DOCUMENTS

| | | |
|---|---|---|
| CN | 107395353 | 11/2017 |
| CN | 107450981 | 12/2017 |
| CN | 107578336 | 1/2018 |
| CN | 107679857 | 2/2018 |

OTHER PUBLICATIONS

International Search Report and Written Opinion issued in PCT/CN2018/086154, dated Jan. 30, 2019.

\* cited by examiner

METHOD AND APPARATUS FOR REACHING BLOCKCHAIN CONSENSUS

This application is the U.S. national phase entry of PCT Patent Application No. PCT/CN2018/086154 filed May 9, 2018.

TECHNICAL FIELD

The present disclosure relates to a field of internet technology, and particularly to a method and an apparatus for reaching a blockchain consensus.

BACKGROUND

Blockchain technology is a distributed accounting technology, which has been widely valued for its advantages of decentralization, immutability, and no third-party trust guarantee. Due to features of the distributed storage and decentralization of blockchain technology, a consensus mechanism is particularly important in blockchain technology. In particular, a Proof of Work consensus mechanism, a Proof of Stake consensus mechanism, and a Delegated Proof of Stake consensus mechanism are widely known.

In a process of realizing the concept of the present disclosure, the inventor found that there are at least following problems in the prior art: the Proof of Work consensus mechanism needs to consume a lot of computing resources, and the Proof of Stake consensus mechanism and the Delegated Proof of Stake consensus mechanism have a problem of a certain degree of centralization. As the blockchain nodes that produce the block data structure in the blockchain network will get token rewards, based on the above two consensus mechanisms, the blockchain nodes that initially hold more tokens will get more opportunities to produce block data structures, thereby obtaining more tokens and causing the blockchain network to become more and more centralized.

SUMMARY

In view of this, the present disclosure provides a method and an apparatus for reaching a blockchain consensus.

An aspect of the embodiments of the present disclosure provides a method for reaching a blockchain consensus, comprising: receiving election data transmitted from a blockchain node having a first account balance and/or a second account balance, the election data comprising information about a blockchain node selected by the blockchain node that transmits the election data; and determining a consensus blockchain node from blockchain nodes selected by each election data based on the election data received in this round, so that the consensus blockchain node performs a block packaging operation in a new round; wherein a value in the first account of each blockchain node indicates a number of digital currencies that the blockchain node has, and a value in the second account of each blockchain node indicates a number of votes that the blockchain node has.

Optionally, the method further comprising: receiving transaction information transmitted from a blockchain node; determining whether the transaction information satisfies a predetermined condition or not, and if yes, determining a first numerical value, and the first numerical value indicates a value added to the second account of a blockchain node being a provider of a transaction object corresponding to the transaction information; and transmitting the first numerical value to other blockchain nodes, so that each blockchain node stores the first numerical value in its corresponding blockchain database.

Optionally, the determining whether the transaction information satisfies a predetermined condition or not described above comprises: determining whether the transaction object corresponding to the transaction information is a consumable resource or not; if yes monitoring whether the transaction object corresponding to the transaction information is used up by a blockchain node being a purchaser of the transaction object corresponding to the transaction information or not; if yes determining that the transaction information satisfies the predetermined conditions.

Optionally, the consumable resource comprises at least one of the following: network traffic data resources and computing power resources of a processor; wherein the monitoring whether the transaction object corresponding to the transaction information is used up by a blockchain node being a purchaser of the transaction object corresponding to the transaction information or not described above comprises: receiving transaction feedback information transmitted from the blockchain node being the purchaser of the transaction object, and determining whether the transaction object is used up by the blockchain node based on the transaction feedback information or not; or acquiring a usage log of the transaction object, and determining whether the transaction object is used up by the blockchain node being the purchaser of the transaction object based on the usage log or not.

Optionally, the election data further comprises: a second numerical value and/or a third numerical value; for the election data transmitted from each blockchain node, a sum of the second numerical values in the election data is not greater than the first account balance of the blockchain node, and a sum of the third numerical values in the election data is not greater than the second account balance of the blockchain node; wherein the method further comprises: acquiring a weight of the second numerical value and a weight of the third numerical value; wherein the determining a consensus blockchain node from blockchain nodes selected by each election data based on the election data received in this round comprises: counting a sum of the second numerical values corresponding to each selected blockchain node in the election data received in this round, and a sum of the third numerical values corresponding to each selected blockchain node in the election data received in this round; obtaining an election score of each selected blockchain node according to the sum of the second numerical values and the weight of the second numerical value corresponding to each selected blockchain node, and the sum of the third numerical values and the weight of the third numerical value corresponding to each selected blockchain node; and sorting the selected blockchain nodes in the election data received in this round according to the election scores from high to low, and determining the first predetermined number of blockchain nodes as consensus blockchain nodes, so that the consensus blockchain nodes sequentially perform block packaging operations according to predetermined rules in a new round.

Optionally, the acquiring a weight of the second numerical value and a weight of the third numerical value comprises: counting a sum of the second numerical values and a sum of the third numerical values in the election data received in this round; and determining a weight of the second numerical value and a weight of the third numerical value to satisfy that a product of the sum of the second numerical values and the weight of the second numerical value is equal to a product of the sum of the third numerical values and the weight of the third numerical value.

Optionally, the method described above further comprising: determining a fourth numerical value for each blockchain node that transmits election data, the fourth numerical value is equal to the sum of the third numerical values in the election data transmitted from the blockchain node in this round, and the fourth numerical value indicates a value decreased from the second account of the blockchain node; and transmitting the fourth numerical value to other blockchain nodes, so that each blockchain node stores the fourth numerical value in its corresponding blockchain database.

Optionally, the method described above further comprises: after determining a predetermined number of consensus blockchain nodes, for each consensus blockchain node, generating a non-repeated random number, so that the consensus blockchain node sequentially performs a predetermined number of block packaging operations in an order of the corresponding random numbers in a new round.

Another aspect of the embodiments of the present disclosure provides an apparatus for reaching a blockchain consensus, comprising: a receiving module configured to receive election data transmitted from a blockchain node having a first account balance and/or a second account balance, the election data comprising information about a blockchain node selected by the blockchain node that transmits the election data; and a consensus module configured to determine a consensus blockchain node from blockchain nodes selected by each election data based on the election data received in this round, so that the consensus blockchain node performs a block packaging operation in a new round; wherein a value in the first account of each blockchain node indicates a number of digital currencies that the blockchain node has, and a value in the second account of each blockchain node indicates a number of votes that the blockchain node has.

Optionally, the apparatus described above further comprising: a vote issuing module; the receiving module is further configured to receive transaction information transmitted from a blockchain node; and the vote issuing module is configured to determine whether the transaction information satisfies a predetermined condition or not, and if yes, determine a first numerical value, and the first numerical value indicates a value added to the second account of a blockchain node being a provider of a transaction object corresponding to the transaction information; and transmit the first numerical value to other blockchain nodes, so that each blockchain node stores the first numerical value in its corresponding blockchain database.

Optionally, the vote issuing module is configured to determine whether the transaction object corresponding to the transaction information is a consumable resource or not; if yes, monitor whether the transaction object corresponding to the transaction information is used up by a blockchain node being a purchaser of the transaction object corresponding to the transaction information or not; if yes, determine that the transaction information satisfies the predetermined conditions.

Optionally, the consumable resource comprises at least one of the following: network traffic data resources and computing power resources of a processor; and/or wherein the vote issuing module is configured to receive transaction feedback information transmitted from the blockchain node being the purchaser of the transaction object, and determine whether the transaction object is used up by the blockchain node based on the transaction feedback information or not; or acquire a usage log of the transaction object, and determine whether the transaction object is used up by the blockchain node being the purchaser of the transaction object based on the usage log or not.

Optionally, the election data further comprises: a second numerical value and/or a third numerical value; for the election data transmitted from each blockchain node, a sum of the second numerical values in the election data is not greater than the first account balance of the blockchain node, and a sum of the third numerical values in the election data is not greater than the second account balance of the blockchain node; the consensus module is further configured to acquire a weight of the second numerical value and a weight of the third numerical value; the consensus module is configured to count a sum of the second numerical values corresponding to each selected blockchain node in the election data received in this round, and a sum of the third numerical values corresponding to each selected blockchain node in the election data received in this round; obtain an election score of each selected blockchain node according to the sum of the second numerical values and the weight of the second numerical value corresponding to each selected blockchain node, and the sum of the third numerical values and the weight of the third numerical value corresponding to each selected blockchain node; and sort the selected blockchain nodes in the election data received in this round according to the election scores from high to low, and determine the first predetermined number of blockchain nodes as consensus blockchain nodes, so that the consensus blockchain nodes sequentially perform block packaging operations according to predetermined rules in a new round.

Optionally, the consensus module is configured to count a sum of the second numerical values and a sum of the third numerical values in the election data received in this round; and determine a weight of the second numerical value and a weight of the third numerical value to satisfy that a product of the sum of the second numerical values and the weight of the second numerical value is equal to a product of the sum of the third numerical values and the weight of the third numerical value.

Optionally, the consensus module is further configured to determine a fourth numerical value for each blockchain node that transmits election data, the fourth numerical value is equal to the sum of the third numerical values in the election data transmitted from the blockchain node in this round, and the fourth numerical value indicates a value decreased from the second account of the blockchain node; and transmit the fourth numerical value to other blockchain nodes, so that each blockchain node stores the fourth numerical value in its corresponding blockchain database.

Optionally, the consensus module is further configured to generate a non-repeated random number for each consensus blockchain node after determining a predetermined number of consensus block chain nodes, so that the consensus blockchain node sequentially executes a predetermined number of block packaging operations in an order of the corresponding random numbers in a new round.

Another aspect of the embodiments of the present disclosure provides a computer system, comprising a memory, a processor, and a computer program stored on the memory and running on the processor, and when the processor executes the program, the method as described above.

Another aspect of the embodiments of the present disclosure provides an electronic device, comprising: a memory having stored thereon executable instructions, and a processor configured to implement the method described above when the executable instructions are executed.

Another aspect of the embodiments of the present disclosure provides a non-volatile storage medium storing computer-executable instructions, which are used to implement the method described above when executed.

Another aspect of the embodiments of the present disclosure provides a non-transitory computer-readable medium having stored thereon executable instructions which, when executed by a processor, cause the processor to implement the method described.

Another aspect of the embodiments of the present disclosure provides a computer program. The computer program includes computer-executable instructions that, when executed, are used to implement the method described above.

BRIEF DESCRIPTION OF THE DRAWINGS

Through the following description of the embodiments of the present disclosure with reference to the accompanying drawings, the above and other objectives, features, and advantages of the present disclosure will be more apparent, in the accompanying drawings.

DETAILED DESCRIPTION OF EMBODIMENTS

Hereinafter, embodiments of the present disclosure will be described with reference to the drawings. However, it should be understood that these descriptions are only exemplary, and are not intended to limit the scope of the present disclosure. In the following detailed description, for ease of explanation, many specific details are set forth to provide a comprehensive understanding of the embodiments of the present disclosure. However, obviously, one or more embodiments may also be implemented without these specific details. In addition, in the following description, descriptions of well-known structures and technologies are omitted to avoid unnecessarily obscuring the concept of the present disclosure.

The terms used herein are only for describing specific embodiments, and are not intended to limit the present disclosure. The terms "including", "comprising", etc. used herein indicate the existence of the described features, steps, operations and/or components, but do not exclude the presence or addition of one or more other features, steps, operations or components.

All terms (including technical and scientific terms) used herein have meanings commonly understood by those skilled in the art, unless otherwise defined. It should be noted that the terms used herein should be interpreted as having meanings consistent with the context of this specification, and should not be interpreted in an idealized or overly rigid manner.

In the case of using an expression similar to "at least one of A, B and C, etc.", generally speaking, it should be interpreted according to the meaning of the expression commonly understood by those skilled in the art (for example, "a system having at least one of the A, B, and C" shall include but not limited to systems having A alone, B alone, C alone, having A and B, having A and C, having B and C, and/or having A, B, and C, etc.). In the case of using an expression similar to "at least one of A, B or C, etc.", generally speaking, it should be interpreted according to the meaning of the expression commonly understood by those skilled in the art (for example, "a system having at least one of the A, B, and C" shall include but not limited to systems having A alone, B alone, C alone, having A and B, having A and C, having B and C, and/or having A, B, and C, etc.). Those skilled in the art should also understand that essentially any transitional conjunctions and/or phrases representing two or more optional objects, whether in the description, claims or drawings or not, should be understood as giving the possibility of including one of these objects, any one of these objects, or two objects. For example, the phrase "A or B" should be understood to include the possibilities of "A" or "B", or "A and B".

Figure 1:
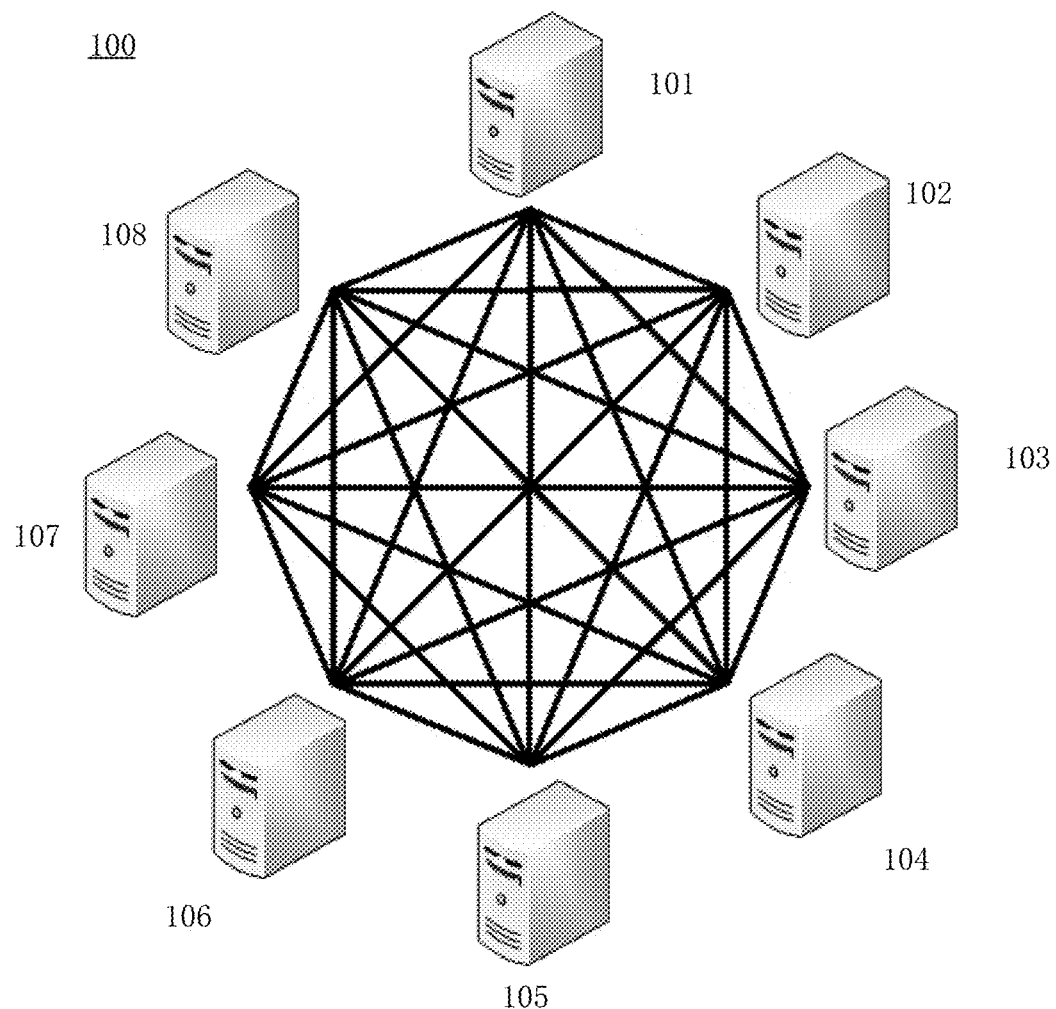
FIG. 1 schematically shows an exemplary system architecture in which a method and an apparatus for reaching a blockchain consensus may be applied according to an embodiment of the present disclosure.

FIG. 1 schematically shows an exemplary system architecture to which a method and an apparatus for reaching a blockchain consensus may be applied according to an embodiment of the present disclosure. It should be noted that FIG. 1 is only an example of the system architecture to which the embodiment of the present disclosure may be applied to help those skilled in the art understand the technical content of the present disclosure, but it does not mean that the embodiment of the present disclosure cannot be used for other equipment, system, environment or scenario.

As shown in FIG. 1, the system architecture 100 according to this embodiment may include blockchain nodes 101, 102, 103, 104, 105, 106, 107, 108 . . . (other blockchain nodes are not shown in the figure). These multiple blockchain nodes form a blockchain network, and each blockchain node corresponds to a blockchain database. These multiple blockchain nodes form a database storage system that is distributed around the world and may operate in coordination. Each blockchain node has the same rights and obligations as all other blockchain nodes. Each blockchain node may determine some block chain nodes as consensus blockchain nodes through a certain consensus mechanism. Any one of the consensus blockchain nodes performs read and write operations in its corresponding blockchain database. Other blockchain nodes may complete synchronization according to a certain mechanism, so as to realize that the data in the blockchain databases corresponding to all blockchain nodes in the blockchain network is completely consistent.

These multiple blockchain nodes are servers deployed around the world. Each blockchain node may be a server or a server cluster. The server/server cluster may be a server/server cluster that provides various services, such as a background management server (just an example) that provides support for websites browsed by users using terminal devices. The background management server may analyze and process the received user request and other data, and feedback the processing result (for example, webpage, information, or data acquired or generated according to the user request) to the terminal device.

It should be understood that the number of blockchain nodes shown in FIG. 1 is only illustrative. According to implementation needs, there may be any number of blockchain nodes.

Figure 2:
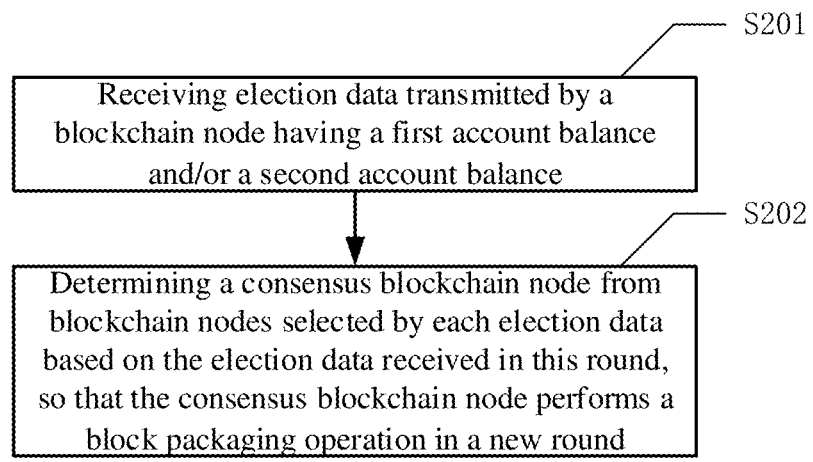
FIG. 2 schematically shows a flowchart of a method for reaching a blockchain consensus according to an embodiment of the present disclosure.

FIG. 2 schematically shows a flowchart of a blockchain consensus reaching method according to an embodiment of the present disclosure.

As shown in FIG. 2, the method includes, in operation S201, receiving election data transmitted from a blockchain node having a first account balance and/or a second account balance.

It needs to be explained in advance that a value in the first account of each blockchain node is used to indicate a number of digital currencies that the blockchain node has, and a value in the second account of each blockchain node is used to indicate a number of votes that the blockchain node has. The blockchain node with the first account balance refers to the blockchain node that holds digital currencies, and the blockchain node with the second account balance refers to the blockchain node that holds votes, and the source of the received election data in operation S201 may be: blockchain nodes holding digital currencies, blockchain nodes holding votes, blockchain nodes holding both digital currencies and votes. Where the digital currency is a virtual currency that is exchanged in a blockchain network, and the vote is a virtual currency different from digital currency that is transmitted to blockchain nodes according to certain rules.

In this operation, the election data is used to indicate an event that the blockchain node that transmits the election data selects another blockchain node to vote, and each piece of election data received includes: information of a blockchain node selected by a blockchain node that transmits the election data. For example, the blockchain node A transmits a piece of election data, which includes the information of the blockchain node B selected by the blockchain node A, indicating that the blockchain node A selects the blockchain node B for voting.

Then, in operation S202, a consensus blockchain node is determined from the blockchain nodes selected by each election data based on the election data received in this round, so that the consensus blockchain node performs a block packaging operation in the new round.

It can be seen that the method shown in FIG. 2 determines the consensus blockchain node through the election data transmitted from each blockchain node. Specifically, the blockchain node that transmits the election data is a blockchain node that holds votes and/or digital currencies. The election data contains the information of the blockchain node selected by the blockchain node that transmits the election data, and the consensus blockchain node is determined from the blockchain nodes selected by each election data in one round. Compared with the scheme of determining consensus blockchain nodes in the prior art, this scheme does not need to consume the computing power resources of the blockchain nodes. As the scheme exerts an influence on the election rights of the blockchain nodes through votes and digital currencies, it may effectively prevent the blockchain consensus from developing towards the centralized trend of digital currency gathering in a few blockchain nodes, and maintain the decentralized characteristics of the blockchain network.

In an embodiment of the present disclosure, before operation S201, the method shown in FIG. 2 further includes: receiving transaction information transmitted from a blockchain node; determining whether the received transaction information satisfies a predetermined condition or not, and if yes, determining a first numerical value; transmitting the determined first numerical value to other blockchain nodes, so that each blockchain node stores the first numerical value in its corresponding blockchain database. Where the first numerical value is used to indicate a value added to the second account of the blockchain node being a provider of a transaction object corresponding to the transaction information. This embodiment describes a scheme for issuing votes to blockchain nodes. The transaction information is information about the event of transactions between blockchain nodes. In different situations, the blockchain node being the provider of the transaction object may be a full node or a light node. A blockchain node being a purchaser of a transaction object may be a full node or a light node. The full node is a blockchain node that may perform block data structure packaging operations, perform data recording operations, and run smart contracts, and the light node may not perform block data structure packaging operations and data recording operations, nor may they run smart contracts. However, both the full node and the light node may have a first account and a second account.

The transaction information transmitted from the blockchain node includes at least one of the following: information about the transaction object, information about the provider of the transaction object, and information about the purchaser of the transaction object. If it is determined that the transaction information satisfies the predetermined conditions, the first numerical value of votes are transmitted to the blockchain node being the provider of the transaction object. When issuing votes, identification information of the blockchain node being the provider of the transaction object and the determined first numerical value may be broadcast to each blockchain node, so that each blockchain node with data recording function may correspondingly store the identification information of the blockchain node being the provider of the transaction object and the first numerical value in the respective blockchain database, and corresponding relationships between the identification information of the blockchain node being the provider of the transaction object and the first numerical value are uniformly recorded in each blockchain database, that is, the information indicating the increase of the first numerical value in the second account of the blockchain node being the provider of the transaction object is uniformly recorded. This information is in the blockchain database and will not be tampered with.

In an embodiment of the present disclosure, determining whether the transaction information satisfies the predetermined conditions or not includes: first determining whether the transaction object corresponding to the transaction information is a consumable resource or not, and if the transaction object is the consumable resource, monitoring whether the transaction object corresponding to the transaction information is used up by a blockchain node being a purchaser of the transaction object corresponding to the transaction information or not, and if the corresponding transaction object is used up by the blockchain node being the purchaser of the transaction object, determining that the transaction information satisfies the predetermined conditions.

Specifically, consumable resources refer to resources that will no longer exist once they are used, such as one or more of network traffic data resources, processor computing power resources, and so on. In this embodiment, consumable resources are directly traded among blockchain nodes in the blockchain network. The blockchain node being the provider of the transaction object provides the consumable resources that are traded, the blockchain node being the purchaser of the transaction object uses the consumable resources that are traded, and the transaction is completed when it is used. That is, in this embodiment, for a transaction of consumable resources, when the transaction is completed, the specific first numerical value may be determined according to the quantity and/or quality of the transaction, and the votes with the first numerical value are issued to the blockchain node that provides the consumable resource to provide the blockchain node with the right to participate in the election of consensus blockchain nodes.

In comparison, the proof-of-stake consensus mechanism and delegated proof-of-stake consensus mechanism in the prior art are prone to the nothing-at-stake problem. The so-called nothing-at-stake problem refers to: in some special circumstances, such as the network delays, a certain blockchain node that produces the block data structure maliciously changes the position of the block data structure chain into the block chain data structure, etc., resulting in a fork in the blockchain database, that is, two different chains are formed. Although the consensus mechanism stipulates that all blockchain nodes should produce block data structures on the longest chain, there is uncertainty about which chain may become the longest chain in the future. Therefore, in order to maximize their own interests, the current blockchain nodes that produce block data structures may produce block data structures on two different chains at the same time, and this decision may lead to the problem that there will always be multiple forks in the blockchain database. The solution of the above embodiment takes advantage of the feature that consumable resources may not be reused, so that after the transaction information of consumable resources is recorded on one forked chain of the blockchain database, it may not be recorded on another forked chain. In order to ensure that the transaction information of the blockchain node being the provider of the transaction object is confirmed by each blockchain node and stored in the blockchain database, the blockchain node being the provider of the transaction object may only choose to save the corresponding transaction information through the forked chain that will become the longest chain in the future. Due to the selection of the blockchain node being the provider of the transaction object, the usage rate of other chains except the longest chain in the blockchain database is greatly reduced. In addition, if the blockchain database generates multiple forked chains, each blockchain node has the same number of digital currencies based on different forked chains, and due to the non-reusable feature of consumable resources, it will lead the blockchain nodes providing consumable resources to be at a disadvantage. Therefore, for the purpose of protecting interests of the blockchain node being the provider of the transaction object, the blockchain node being the provider of the transaction object may strictly monitor the consensus blockchain node producing the block data structure. When the blockchain node being the provider of the transaction object selects consensus blockchain nodes, it may not select those consensus blockchain nodes maintaining multiple fork chains at the same time. For the above two reasons, the above embodiment may improve the problem of book bifurcation.

In an embodiment of the present disclosure, if it is determined that the transaction information is a consumable resource, the monitoring whether the transaction object corresponding to transaction information is used up by the blockchain node being the purchaser of the transaction object corresponding to the transaction information or not described above has at least the following two types: receiving transaction feedback information transmitted from the blockchain node being the purchaser of the transaction object, and determining whether the transaction object is used up by the blockchain node being the purchaser of the transaction object based on the transaction feedback information or not; or acquiring a usage log of the transaction object, and determining whether the transaction object is used up by the blockchain node being the purchaser of the transaction object based on the usage log or not.

A specific example is used to illustrate the above-mentioned embodiment. A blockchain node A and a blockchain node B conduct transactions, the transaction object is a network traffic data resource, the provider of the transaction object is the blockchain node A, and the purchaser of the transaction object is the blockchain node B. The blockchain node A is a full node, the blockchain node B is a light node, and the blockchain node B wants to use the network traffic data resources provided by the blockchain node A. Transaction information transmitted from the blockchain node A is received, the transaction information includes the rule part: quality parameters, quantity, and price of the network traffic data resources of the transaction, the information of the blockchain node A, and the information of the blockchain node B. Preferably, the transaction information further includes a digital signature of the transaction information. The digital signature of the transaction information includes a first digital signature and a second digital signature. The first digital signature is generated based on a private key of the blockchain node B and the rule part of the transaction information, the second digital signature is generated based on a private key of the blockchain node A, the first digital signature, and the rule part of the transaction information. The blockchain node that receives the transaction information transmitted from the blockchain node A verifies the digital signature of the transaction information through the public key of the blockchain node A and the public key of the blockchain node B, and the verification indicates that the transaction information is true and effective. As the transaction object is a network traffic data resource, that is, a consumable resource, the vote issuance smart contract deployed in the blockchain database is triggered to run in the blockchain node that currently performs the block data structure packaging operation, and the vote issuance smart contract tracks and confirms the use of network traffic data resources by the blockchain node B. Once used, the vote issuance smart contract determines a first numerical value based on the quality parameters and quantity of the network traffic data resources recorded in the transaction information. The information of the blockchain node A and the first numerical value are transmitted to each blockchain node, so that after each blockchain node passes the consensus verification, the information of the blockchain node A and the first numerical value are correspondingly saved in respective blockchain databases of the blockchain nodes. It means adding the first numerical number of votes to the second account of the blockchain node A.

In an embodiment of the present disclosure, in addition to the information of the blockchain node selected by the blockchain node that transmits the election data, each piece of election data transmitted from a blockchain node with a first account balance and/or a second account balance also includes: a second numerical value and/or a third numerical value. Where for the election data transmitted from each blockchain node, a sum of the second numerical values in the election data is not greater than the first account balance of the blockchain node, and a sum of the third numerical values in the election data is not greater than the second account balance of the blockchain node. In other words, the second numerical value contained in a piece of election data indicates a number of digital currencies in the first account balance using this piece of election data for elections, and the third numerical value contained in a piece of election data indicates a number of votes in the second account balance using this piece of election data for elections. In the process of electing consensus blockchain nodes, the election data transmitted from each blockchain node not only includes the information of the selected blockchain node, but also includes the number of digital currencies and/or votes used by the blockchain node that transmits the election data when selecting other blockchains. It may be seen that blockchain nodes are only eligible to transmit election data when they hold digital currencies and/or votes, that is, digital currencies and votes affect the election right of the blockchain nodes in two ways.

After receiving the election data transmitted from each blockchain node in this round, in order to determine a consensus blockchain node from the blockchain nodes selected by each election data based on the election data received in this round, it is necessary to acquire a weight of the second numerical value and a weight of the third numerical value. In the embodiment of the present disclosure, the weight of the second numerical value indicates the weight of the digital currency in the election scenario, and the weight of the third numerical value indicates the weight of the vote in the election scenario. And operation S202 in FIG. 2 is based on the election data received in this round, and determines a consensus blockchain node from the selected blockchain nodes in each election data, including:

in operation S2021, counting a sum of the second numerical values corresponding to each selected blockchain node in the election data received in this round, and a sum of the third numerical values corresponding to each selected blockchain node in the election data received in this round;

in operation S2022, obtaining an election score of each selected blockchain node according to the sum of the second numerical values and the weight of the second numerical value corresponding to each selected blockchain node, and the sum of the third numerical values and the weight of the third numerical value corresponding to each selected blockchain node; and in operation S2023, sorting the selected blockchain nodes in the election data received in this round according to the election scores from high to low, and determining the first predetermined number of blockchain nodes as consensus blockchain nodes, so that the consensus blockchain nodes sequentially perform block packaging operations according to predetermined rules in a new round.

For example, one or more pieces of the election data select blockchain node A, and one or more pieces of the election data select blockchain node B, and one or more pieces of the election data select blockchain node C in the election data received in this round. For the selected blockchain node A, counting a sum of the second numerical values in the election data for selecting the blockchain node A, that is, counting a total number of digital currencies used in the election data for selecting the blockchain node A, and counting a sum of the third numerical values in the election data for selecting the blockchain node A, that is, counting a total number of votes used in the election data for selecting blockchain node A, such as a sum of the second numerical values in all election data for selecting the blockchain node A is x, and a sum of the third numerical values in all election data for selecting the blockchain node A is y. For each of the selected blockchain nodes B and C, the same is true for calculating a sum of the second numerical values and a sum of the third numerical values.

It has been learned that the weight of the second numerical values is a, and the weight of the third numerical values is b. For the selected blockchain node A, according to the sum of the second numerical values and the weight of the second numerical values corresponding to the blockchain node, and the sum of the third numerical values and the weight of the third numerical values corresponding to the blockchain node, the election score L(A) of the blockchain node A may be obtained in the following way:

$$L(A)=a \times x + b \times y$$

In the same way, the election score L(B) of the selected blockchain node B and the election score L(C) of the selected blockchain node C may be calculated. The selected blockchain nodes in the election data received in this round according to the election score from high to low are sorted. Assuming that the sorting result is L(A)>L(C)>L(B), it means that a total weight of election data for selecting the blockchain node A as a consensus blockchain node is greater than a total weight of election data for selecting the blockchain node C as a consensus blockchain node is greater than a total weight of election data for selecting the blockchain node B as a consensus blockchain node. The first two corresponding blockchain nodes A and C are selected as the consensus blockchain nodes, so that the consensus blockchain nodes A and C may perform the block packaging operations in sequence according to the predetermined rules in a new round. For example, in the new round, when it is the turn of the blockchain node A to perform the block packaging operation, the blockchain node A reads the data from the to-be-processed memory pool and packs the verified data into a block data structure and chains the block data structure into a blockchain database corresponding to the blockchain node A, and broadcasts to other blockchain nodes, so that other blockchain nodes may chain the same block data structure to their corresponding blockchain database synchronously to realize the unified update of the blockchain database. The blockchain node B's turn to perform the block packaging operation is the same, which will not repeat here.

In the foregoing embodiments, each implementation process involved in operations S201-S202 of the method shown in FIG. 2 may be executed by an election smart contract deployed in a blockchain database. When the pre-specified election conditions are satisfied, such as when a specified round period ends, when a specified block height reaches, etc., the election smart contract is triggered to start executing the operations that receiving the election data, and determining the consensus blockchain nodes based on the election data as described in each of the above embodiments. It should be noted that various smart contracts as mentioned above are smart contracts such as vote issuance smart contract, election smart contract, etc. The smart contracts are essentially code that may be triggered for execution, and usually pre-stored in the blockchain database. The smart contract stored in the blockchain database is difficult to be tampered with, so the smart contract may be used to execute the predetermined code logic, and the execution process is not subject to the intervention of the blockchain node. In the embodiments of present disclosure, smart contracts are used to execute different code logics in multiple different operations. Different code logics may be executed through different smart contracts or the same smart contract. There is no restriction on this. In short, the role of smart contracts is to ensure that blockchain nodes execute predetermined code logic and prevent blockchain nodes from doing evil.

It may be seen from the above embodiment that the weight of the second numerical value and the weight of the third numerical value may affect the voting results. Therefore, this solution may adjust the degree of influence that the digital currencies and the votes respective exert on the election results in the election scenario by controlling the weight of the second numerical value and the weight of the third numerical value, and then adjust the trend and degree of centralization of the entire blockchain network. In an embodiment of the present disclosure, the above method for acquiring a weight of the second numerical value and a weight of the third numerical value may be: counting a sum of the second numerical values and a sum of the third numerical values in the election data received in this round; determining a weight of the second numerical value and a weight of the third numerical value to satisfy that a product of the sum of the second numerical values and the weight of the second numerical value is equal to a product of the sum of the third numerical values and the weight of the third numerical value.

For example, at the beginning of a new round, blockchain nodes holding digital currencies and blockchain nodes holding votes may jointly participate in the election process. In order to roughly balance the degree of influence that the digital currencies and votes may exert on the election result, in this example, the ratio of a total weight of the digital currencies used by all election data received in this round and a total weight of the votes used by all election data received in this round is allowed to be 1:1. If 500 digital currencies are used in all election data received in this round, and 100 votes are used in all election data received in this round, the weight of each digital currency is 0.5/500=0.001, and the weight of each vote is 0.5/100=0.005, that is, the weight of the second numerical value is 0.001, and the weight of the third numerical value is 0.005. The election smart contract receives the election data transmitted from the blockchain node holding the digital currencies and the blockchain node holding the votes. Each piece of the election data records the information of blockchain node selected by the blockchain node that transmits the piece of the election data, the second numerical value, and/or the third numerical value. The smart contract calculates the election score corresponding to each selected blockchain node, and sorts all the selected blockchain nodes according to the election score, and determines the first 100 selected blockchain nodes as the consensus blockchain nodes which are performed block production in turns according to predetermined rules in the next round.

After determining the consensus blockchain nodes in the new round, that is, after the election process is over, the digital currencies used in each piece of the election data may be returned to the blockchain node that transmits the piece of the election data. The votes used in each piece of the election data may be destroyed and not returned to the blockchain node that transmits the piece of the election data. In this way, the digital currencies used in the election process may continue to be used for transactions by the blockchain nodes, and the votes used in the election process may no longer be used for any purpose. For this reason, in an embodiment of the present disclosure, after operation S202, the method shown in FIG. 2 further includes: for a blockchain node that transmits a piece of election data, when the election data contains a second numerical value, the first account balance of the blockchain node does not change due to the transmission of the election data. When the election data contains a third numerical value, the second account balance of the blockchain node may decrease due to the transmission of election data. Specifically, for each blockchain node that transmits election data, a fourth numerical value is determined, which is equal to the sum of the third numerical values in the election data transmitted from the blockchain node in this round, and the fourth numerical value is used to indicate a value decreased from the second account of the blockchain node. The determined fourth numerical value is transmitted to other blockchain nodes, so that each blockchain node stores the fourth numerical value in its corresponding blockchain database.

For example, in this round, the blockchain node A transmits a total of 3 pieces of the election data, a third numerical value in a first piece of the election data is 8, a third numerical value in a second piece of the election data is 5, and a third numerical value in a third piece of the election data is 0. The third numerical value in each piece of the election data indicates the number of votes cast by blockchain node A for the election data, that is, a sum of the third numerical values in the election data transmitted from blockchain node A in this round is 13, that is, a total of 13 votes were cast. Once these 13 votes have been used, they are invalid and may no longer be used. Therefore, the fourth numerical value is determined to be 13, which means that the second account of the blockchain node A decreases by 13, that is, the number of votes held by blockchain node A decreases by 13. In order to make the process more secure and reliable, the identification of the blockchain node A and the fourth numerical value indicating a certain value decreased from the second account of the blockchain node A are broadcast to each blockchain node, and are stored by each blockchain node in their corresponding blockchain database. The blockchain database records information about how many votes each blockchain node uses and how many votes are decreased in the second account in each round, and the record cannot be tampered with.

In an embodiment of the present disclosure, after the predetermined number of consensus blockchain nodes are determined, the method shown in FIG. 2 further includes: for each consensus blockchain node, generating a non-repeated random number, so that the consensus blockchain node sequentially executes a predetermined number of block packaging operations in the order of the corresponding random numbers in the new round. For example, after sorting the selected blockchain nodes according to the election scores from high to low, the first 100 blockchain nodes are determined to be consensus blockchain nodes. For each of the 100 blockchain nodes, a non-repeating random number from 1 to 100 is generated, and the random number corresponding to each blockchain node is not repeated. Starting from the blockchain corresponding to 1 in the order of the random number, and block packaging operations are performed sequentially in a new round. The numerical values in this example are illustrative examples and do not impose any limitation on the present disclosure. In this scheme, the new round and the current round may be two adjacent rounds, or two rounds separated by several rounds, for example, the current round is the 1st round, the new round may be the $2^{nd}$ round, the $3^{rd}$ round, the 4th round . . . , there is no restriction here, as long as the consensus blockchain node of the next round is determined in the previous round is sufficient.

According to the embodiments of the present disclosure, it is possible to at least partially solve/mitigate/inhibit/even avoid the problem that the prior art needs to consume a large amount of computing power of blockchain nodes meaninglessly in the process of reaching a blockchain consensus, and at least partially solve/mitigate/inhibit/even avoid the centralized development trend of digital currency gathered in a small number of blockchain nodes generated in the process of reaching a blockchain consensus in the prior art. The decentralized characteristics of the blockchain network may be maintained to a large extent without wasting computing power resources of blockchain nodes.

Figure 3:
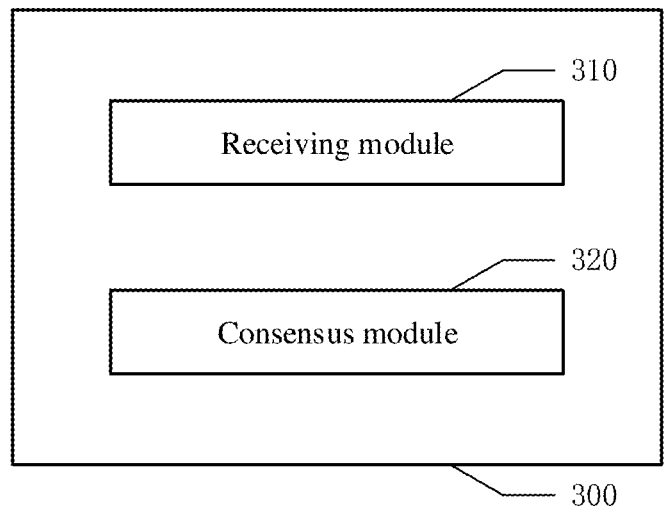
FIG. 3 schematically shows a block diagram of an apparatus for reaching a blockchain consensus according to an embodiment of the present disclosure.

FIG. 3 schematically shows a block diagram of an apparatus for reaching a blockchain consensus according to an embodiment of the present disclosure.

As shown in FIG. 3, the blockchain consensus reaching apparatus 300 includes: a receiving module 310 and a consensus module 320.

The receiving module 310 is configured to receive election data transmitted from a blockchain node with a first account balance and/or a second account balance.

Where each piece of election data includes: information about a blockchain node selected by the blockchain node that transmitted the piece of the election data.

The consensus module 320 is configured to determine a consensus blockchain node from the blockchain nodes selected by each election data based on the election data received in this round, so that the determined consensus blockchain node performs block packaging operations in a new round.

Where a value in the first account of each blockchain node is used to indicate a number of digital currencies that the blockchain node has, and a value in the second account of each blockchain node is used to indicate a number of votes the blockchain node has.

It may be seen that the apparatus shown in FIG. 3 uses the election data transmitted from each blockchain node to determine the consensus blockchain node. Specifically, the blockchain node that transmits the election data is the blockchain node holding votes and/or digital currencies. The election data contains the information of a blockchain node selected by the blockchain node that transmits the election data, and the consensus blockchain node is determined from the blockchain nodes selected by each election data in one round. Compared with the scheme of determining consensus blockchain nodes in the prior art, this scheme does not need to consume the computing power resources of the blockchain nodes. As the scheme exerts an influence on the election rights of the blockchain nodes through votes and digital currencies, it may effectively prevent the blockchain consensus from developing towards the centralized trend of digital currency gathering in a few blockchain nodes, and maintain the decentralized characteristics of the blockchain network.

In an embodiment of the present disclosure, the election data further includes: a second numerical value and/or a third numerical value. For the election data transmitted from each blockchain node, a sum of the second numerical values in the election data is not greater than a sum of the first account balance of the blockchain node, and a sum of the third numerical values in the election data is not greater than the second account balance of the blockchain node.

The consensus module 320 is also configured to acquire a weight of the second numerical values and a weight of the third numerical values. The way that the consensus module 320 determines the consensus blockchain node from the blockchain nodes selected by each piece of the election data based on the election data received in this round may be: counting a sum of the second numerical values corresponding to each selected blockchain node in the election data received in this round, and a sum of the third numerical values corresponding to each selected blockchain node in the election data received in this round. An election score of each selected blockchain node is obtained according to the sum of the second numerical values and the weight of the second numerical value corresponding to each selected blockchain node, and the sum of the third numerical values and the weight of the third numerical value corresponding to each selected blockchain node. The selected blockchain nodes in the election data received in this round are sorted from high to low according to the election scores, and the first predetermined number of blockchain nodes are determined as consensus blockchain nodes, so that the consensus blockchain nodes sequentially perform block packaging operations according to predetermined rules in a new round.

Where the way that the consensus module 320 acquires the weight of the second numerical value and the weight of the third numerical value may be that the consensus module 320 is configured to count a sum of the second numerical values and a sum of the third numerical values in the election data received in this round, and determine a weight of the second numerical values and a weight of the third numerical values to satisfy that a product of the sum of the second numerical values and the weight of the second numerical values is equal to a product of the sum of the third numerical values and the weight of the third numerical values.

Further, in an embodiment of the present disclosure, the votes are disposable, that is, the votes used in the election data transmitted from each blockchain node may not be used again and need to be deducted from the second account of the corresponding blockchain node. Therefore, the consensus module 320 is also configured to determine a fourth numerical value for each blockchain node that transmits the election data, and the fourth numerical value is equal to the sum of the third numerical values in the election data transmitted from the blockchain node in this round. The fourth numerical value is used to indicate a value decreased from the second account of the blockchain node. The fourth numerical value is transmitted to other blockchain nodes, so that each blockchain node stores the fourth numerical value in its corresponding blockchain database.

In an embodiment of the present disclosure, the consensus module 320 is further configured to generate a non-repeated random number for each consensus blockchain node after determining a predetermined number of consensus blockchain nodes, so that the consensus blockchain node sequentially executes a predetermined number of block packaging operations in the order of the corresponding random numbers in the new round.

Figure 4:
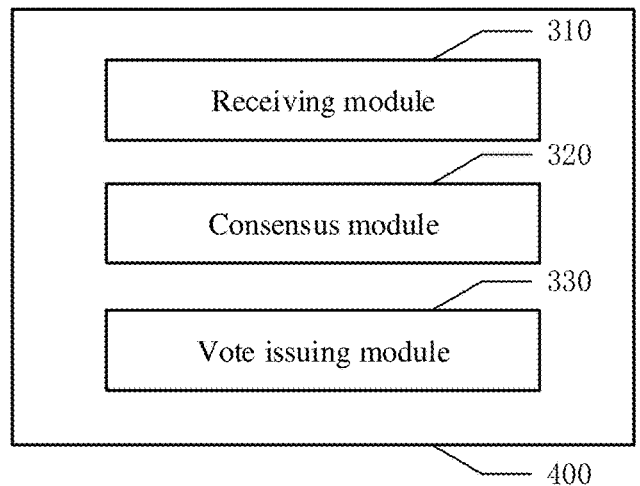
FIG. 4 schematically shows a block diagram of an apparatus for reaching a blockchain consensus according to another embodiment of the present disclosure.

FIG. 4 schematically shows a block diagram of an apparatus for reaching a blockchain consensus according to another embodiment of the present disclosure.

As shown in FIG. 4, the blockchain consensus reaching apparatus 400 includes: a receiving module 310, a consensus module 320, and a vote issuing module 330.

The receiving module 310 and the consensus module 320 have been described above, and the repeated parts will not be repeated. On this basis, the receiving module 310 is further configured to receive transaction information transmitted from the blockchain node.

The vote issuing module 330 is configured to determine whether the transaction information satisfies predetermined conditions or not, and if yes, determine a first numerical value, which is used to indicate a value added to the second account of the blockchain node being a provider of a transaction object corresponding to the transaction information. The first numerical value is transmitted to other blockchain nodes, so that each blockchain node stores the first numerical value in its corresponding blockchain database.

In an embodiment of the present disclosure, the vote issuing module 330 is configured to determine whether the transaction object corresponding to the transaction information is a consumable resource or not; and if yes, monitor whether the transaction object corresponding to the transaction information is used up by the blockchain node being the purchaser of the transaction object corresponding to the transaction information or not; and if yes, confirm that the transaction information satisfies the predetermined conditions.

Specifically, in an embodiment of the present disclosure, the consumable resources include at least one of the following: network traffic data resources and computing power resources of the processor. And/or, the vote issuing module 330 is configured to receive transaction feedback information transmitted from the blockchain node being a purchaser of the transaction object, and determine whether the transaction object has been used up by the blockchain node being the purchaser of the transaction object based on the transaction feedback information or not; or, acquire a usage log of the transaction object and determine whether the transaction object is used up by the blockchain node being the purchaser of the transaction object based on the usage log or not.

It should be noted that the implementation of each of the modules/units/sub-units, etc., the technical problems solved, the functions achieved, and the technical effects achieved in the partial embodiments of the apparatus are same or similar as those of the corresponding steps, the technical problems solved, the functions realized, and the technical effects achieved in the partial embodiments of the method, which will not repeat here.

According to the embodiments of the present disclosure, any number of modules, sub-modules, units, and sub-units, or at least part of the functions of any number of them, may be implemented in one module. Any one or more of the modules, sub-modules, units, and sub-units according to the embodiments of the present disclosure may be split into multiple modules for implementation. Any one or more of the modules, sub-modules, units, and sub-units according to the embodiments of the present disclosure may be at least partially implemented as hardware circuits, such as field programmable gate array (FPGA), programmable logic array (PLA), system-on-chip, system-on-substrate, system-on-package, application-specific integrated circuit (ASIC), or may be implemented by hardware or firmware in any other reasonable way that integrates or encapsulates the circuit, or may be implemented in any one of the three implementations of software, hardware, and firmware or an appropriate combination of any of them. Alternatively, one or more of the modules, sub-modules, units, and sub-units according to the embodiments of the present disclosure may be at least partially implemented as a computer program module, and when the computer program module is run, it may perform corresponding functions.

For example, any of the receiving module 310, the consensus module 320, and the vote issuing module 330 may be combined into one module for implementation, or any one of them may be split into multiple modules. Or at least part of the functions of one or more of these modules may be combined with at least part of the functions of other modules and implemented in one module. According to an embodiment of the present disclosure, at least one of the receiving module 310, the consensus module 320, and the vote issuing module 330 may be at least partially implemented as a hardware circuit, such as a field programmable gate array (FPGA), a programmable logic array (PLA), system-on-chip, system-on-substrate, system-on-package, application specific integrated circuit (ASIC), or may be implemented by hardware or firmware in any other reasonable way that integrates or encapsulates the circuit, or may be implemented by any one of the three implementations of software, hardware, and firmware or an appropriate combination of any of them. Alternatively, at least one of the receiving module 310, the consensus module 320, and the vote issuing module 330 may be at least partially implemented as a computer program module, and when the computer program module is run, it may perform corresponding functions.

Figure 5:
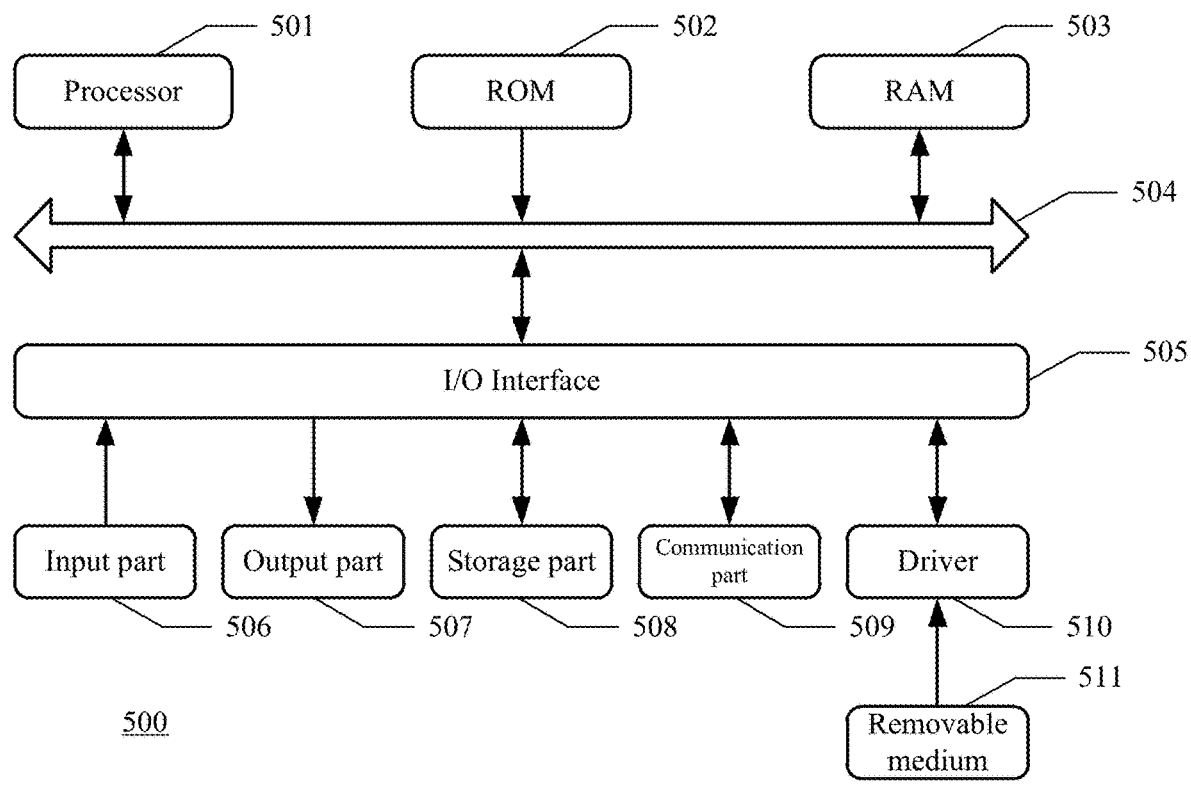
FIG. 5 schematically shows a block diagram of a computer system suitable for implementing a method for reaching a blockchain consensus according to an embodiment of the present disclosure.

FIG. 5 schematically shows a block diagram of a computer system suitable for implementing a blockchain consensus reaching method according to an embodiment of the present disclosure. The computer system shown in FIG. 5 is only an example, and should not bring any limitation to the functions and application scope of the embodiments of the present disclosure.

As shown in FIG. 5, a computer system 500 according to an embodiment of the present disclosure includes a processor 501, which may execute various appropriate actions and processing according to a program stored in a read only memory (ROM) 502 or a program loaded into a random access memory (RAM) 503 from a storage part 508. The processor 501 may include, for example, a general-purpose microprocessor (for example, a CPU), an instruction set processor and/or a related chipset and/or a special-purpose microprocessor (for example, an application specific integrated circuit (ASIC)), and so on. The processor 501 may further include on-board memory for caching purposes. The processor 501 may include a single processing unit or multiple processing units for executing different actions of the method flow according to the embodiments of the present disclosure.

In the RAM 503, various programs and data required for the operation of the system 500 are stored. The processor 501, the ROM 502, and the RAM 503 are connected to each other through a bus 504. The processor 501 executes various operations of the method flow according to the embodiment of the present disclosure by executing the programs in the ROM 502 and/or RAM 503. It should be noted that the program may also be stored in one or more memories other than the ROM 502 and the RAM 503. The processor 501 may also execute various operations of the method flow according to the embodiment of the present disclosure by executing programs stored in the one or more memories.

According to an embodiment of the present disclosure, the system 500 may further include an input/output (I/O) interface 505, and the input/output (I/O) interface 505 is also connected to the bus 504. The system 500 may further include one or more of the following components connected to the I/O interface 505: an input part 506 including a keyboard, a mouse, etc.; an output section 507 including a cathode ray tube (CRT), a liquid crystal display (LCD), and a speaker etc.; a storage part 508 including a hard disk, etc.; and a communication part 509 including a network interface card such as a LAN card, a modem, etc. The communication part 509 performs communication processing via a network such as the internet. The driver 510 is also connected to the I/O interface 505 as needed. A removable medium 511, such as a magnetic disk, an optical disk, a magneto-optical disk, a semiconductor memory, etc., is installed on the driver 510 as needed, so that the computer program read from it is installed into the storage part 508 as needed.

According to an embodiment of the present disclosure, the method flow according to an embodiment of the present disclosure may be implemented as a computer software program. For example, an embodiment of the present disclosure includes a computer program product, which includes a computer program carried on a computer-readable medium, and the computer program contains program code for executing the method shown in the flowchart. In such an embodiment, the computer program may be downloaded and installed from the network through the communication part 509, and/or installed from the removable medium 511. When the computer program is executed by the processor 501, the above-mentioned functions defined in the system of the embodiment of the present disclosure are executed. According to the embodiments of the present disclosure, the systems, devices, apparatuses, modules, units, etc. described above may be implemented by computer program modules.

The present disclosure also provides a computer-readable medium. The computer-readable medium may be included in the device/apparatus/system described in the above-mentioned embodiment; or it may exist alone without being assembled into the device/apparatus/system. The above-mentioned computer-readable medium carries one or more programs, and when the above-mentioned one or more programs are executed, it realizes: the blockchain consensus reaching method described in the above embodiments.

According to an embodiment of the present disclosure, the computer-readable medium may be a computer-readable signal medium or a computer-readable storage medium or any combination of the two. The computer-readable storage medium may be, for example, but not limited to, an electrical, magnetic, optical, electromagnetic, infrared, or semiconductor system, apparatus, or device, or any combination of the above. More specific examples of computer-readable storage medium may include, but not limited to: electrical connections with one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the above. In the present disclosure, the computer-readable storage medium may be any tangible medium that contains or stores a program, and the program may be used by or in combination with an instruction execution system, apparatus, or device. In the present disclosure, a computer-readable signal medium may include a data signal propagated in a baseband or as a part of a carrier wave, and a computer-readable program code is carried therein. This propagated data signal may take many forms, including but not limited to electromagnetic signals, optical signals, or any suitable combination of the foregoing. The computer-readable signal medium may also be any computer-readable medium other than the computer-readable storage medium. The computer-readable medium may send, propagate, or transmit the program for use by or in combination with the instruction execution system, apparatus, or device. The program code contained on the computer-readable medium may be transmitted from any suitable medium, including but not limited to: wireless, wired, optical cable, radio frequency signals, etc., or any suitable combination of the foregoing.

For example, according to an embodiment of the present disclosure, the computer readable medium may include one or more memories other than the ROM 502 and/or RAM 503 and/or ROM 502 and RAM 503 described above.

The flowcharts and block diagrams in the accompanying drawings illustrate the possible implementation architecture, functions, and operations of the system, method, and computer program product according to various embodiments of the present disclosure. In this regard, each block in the flowchart or block diagram may represent a module, program segment, or part of code, and the above-mentioned module, program segment, or part of code contains one or more executable instructions for realizing the specified logic function. It should also be noted that, in some alternative implementations, the functions marked in the block may also occur in a different order from the order marked in the drawings. For example, two blocks shown in succession may actually be executed substantially in parallel, and they may sometimes be executed in the reverse order, which depends on the functions involved. It should also be noted that each block in the block diagram or flowchart, and the combination of blocks in the block diagram or flowchart, may be implemented by a dedicated hardware-based system that performs the specified function or operation, or may be implemented by a combination of dedicated hardware and computer instructions.

Those skilled in the art may understand that the features described in the various embodiments of the present disclosure and/or in the claims may be combined or grouped in various ways, even if such combinations or groups are not explicitly described in the present disclosure. In particular, without departing from the spirit and teaching of the present disclosure, the features described in the various embodiments of the present disclosure and/or in the claims may be combined and/or grouped in various ways. All these combinations and/or groups fall within the scope of the present disclosure.

The embodiments of the present disclosure have been described above. However, these examples are for illustrative purposes only, and are not intended to limit the scope of the present disclosure. Although the respective embodiments are described above, this does not mean that the measures in the respective embodiments cannot be advantageously used in combination. The scope of the present disclosure is defined by the appended claims and their equivalents. Without departing from the scope of the present disclosure, those skilled in the art may make various substitutions and modifications, and these substitutions and modifications should fall within the scope of the present disclosure.

What is claimed is:

1. A method for reaching a blockchain consensus, the method comprising:
receiving election data, in a round, transmitted from a blockchain node having a first account balance and/or a second account balance, the election data comprising information about a blockchain node selected by the blockchain node that transmits the election data;
determining a consensus blockchain node from blockchain nodes selected by each election data based on the election data received in this round, so that the consensus blockchain node performs a block packaging operation in a new round,
wherein a value in the first account of each blockchain node indicates a number of digital currencies that the blockchain node has, and a value in the second account of each blockchain node indicates a number of votes that the blockchain node has;
receiving transaction information transmitted from a blockchain node;
determining a first numerical value, the first numerical value indicating a value added to the second account of a blockchain node being a provider of a transaction object corresponding to the transaction information;

transmitting the first numerical value to other blockchain nodes, so that each blockchain node stores the first numerical value in its corresponding blockchain database; and determining whether the transaction information satisfies a predetermined condition or not, the determining comprising:
  determining whether the transaction object corresponding to the transaction information is a consumable resource or not, and
  monitoring whether the transaction object corresponding to the transaction information is used up by a blockchain node being a purchaser of the transaction object corresponding to the transaction information or not,
  wherein the consumable resource comprises network traffic data resources and/or computing power resources of a processor, and
  wherein the monitoring whether the transaction object corresponding to the transaction information is used up by a blockchain node being a purchaser of the transaction object corresponding to the transaction information or not comprises:
    receiving transaction feedback information transmitted from the blockchain node being the purchaser of the transaction object, and determining whether the transaction object is used up by the blockchain node based on the transaction feedback information or not, or
    acquiring a usage log of the transaction object, and determining whether the transaction object is used up by the blockchain node being the purchaser of the transaction object based on the usage log or not.

2. The method according to claim 1, wherein:
the election data further comprises a second numerical value and/or a third numerical value,
for the election data transmitted from each blockchain node, a sum of the second numerical values in the election data is not greater than the first account balance of the blockchain node, and a sum of the third numerical values in the election data is not greater than the second account balance of the blockchain node; and
wherein the method further comprises:
acquiring a weight of the second numerical value and a weight of the third numerical value;
wherein the determining a consensus blockchain node from blockchain nodes selected by each election data based on the election data received in this round comprises:
  counting a sum of the second numerical values corresponding to each selected blockchain node in the election data received in this round, and a sum of the third numerical values corresponding to each selected blockchain node in the election data received in this round;
  obtaining an election score of each selected blockchain node according to the sum of the second numerical values and the weight of the second numerical value corresponding to each selected blockchain node, and the sum of the third numerical values and the weight of the third numerical value corresponding to each selected blockchain node; and
  sorting the selected blockchain nodes in the election data received in this round according to the election scores from high to low, and determining a first predetermined number of blockchain nodes as consensus blockchain nodes, so that the consensus blockchain nodes sequentially perform block packaging operations according to predetermined rules in a new round.

3. The method according to claim 2, wherein the acquiring a weight of the second numerical value and a weight of the third numerical value comprises:
  counting a sum of the second numerical values and a sum of the third numerical values in the election data received in this round; and
  determining a weight of the second numerical value and a weight of the third numerical value to satisfy that a product of the sum of the second numerical values and the weight of the second numerical value is equal to a product of the sum of the third numerical values and the weight of the third numerical value.

4. The method according to claim 2, further comprising:
  determining a fourth numerical value for each blockchain node that transmits election data, the fourth numerical value is equal to the sum of the third numerical values in the election data transmitted from the blockchain node in this round, and the fourth numerical value indicates a value decreased from the second account of the blockchain node; and
  transmitting the fourth numerical value to other blockchain nodes, so that each blockchain node stores the fourth numerical value in its corresponding blockchain database.

5. The method according to claim 2, further comprising, after the determining the first predetermined number of blockchain nodes as consensus blockchain nodes, for each consensus blockchain node, generating a non-repeated random number, so that the consensus blockchain node sequentially performs a predetermined number of block packaging operations in an order of the corresponding random numbers in a new round.

6. An apparatus for reaching a blockchain consensus, the apparatus comprising:
  a receiving module configured to receive election data, in a round, transmitted from a blockchain node having a first account balance and/or a second account balance, the election data comprising information about a blockchain node selected by the blockchain node that transmits the election data, wherein the receiving module is further configured to receive transaction information transmitted from a blockchain node;
  a consensus module configured to determine a consensus blockchain node from blockchain nodes selected by each election data based on the election data received in this round, so that the consensus blockchain node performs a block packaging operation in a new round, wherein a value in the first account of each blockchain node indicates a number of digital currencies that the blockchain node has, and a value in the second account of each blockchain node indicates a number of votes that the blockchain node has; and
  a vote issuing module configured to:
    determine whether the transaction information satisfies a predetermined condition or not, and if yes, determine a first numerical value, the first numerical value indicating a value added to the second account of a blockchain node being a provider of a transaction object corresponding to the transaction information;

transmit the first numerical value to other blockchain nodes, so that each blockchain node stores the first numerical value in its corresponding blockchain database;

determine whether the transaction object corresponding to the transaction information is a consumable resource or not;

responsive to the transaction object corresponding to the transaction information being a consumable resource, monitor whether the transaction object corresponding to the transaction information is used up by a blockchain node being a purchaser of the transaction object corresponding to the transaction information or not; and responsive to the transaction object corresponding to the transaction information being used up by a blockchain node being a purchaser of the transaction object corresponding to the transaction information, determine that the transaction information satisfies the predetermined condition, wherein:

the consumable resource comprises network traffic data resources and/or computing power resources of a processor, and the vote issuing module is configured to:

receive transaction feedback information transmitted from the blockchain node being the purchaser of the transaction object, and determine whether the transaction object is used up by the blockchain node based on the transaction feedback information or not; or acquire a usage log of the transaction object, and determine whether the transaction object is used up by the blockchain node being the purchaser of the transaction object based on the usage log or not.

7. The apparatus according to claim 6, wherein:

the election data further comprises a second numerical value and/or a third numerical value, for the election data transmitted from each blockchain node, a sum of the second numerical values in the election data is not greater than the first account balance of the blockchain node, and a sum of the third numerical values in the election data is not greater than the second account balance of the blockchain node;

the consensus module is further configured to acquire a weight of the second numerical value and a weight of the third numerical value; and the consensus module is configured to count a sum of the second numerical values corresponding to each selected blockchain node in the election data received in this round, and a sum of the third numerical values corresponding to each selected blockchain node in the election data received in this round; obtain an election score of each selected blockchain node according to the sum of the second numerical values and the weight of the second numerical value corresponding to the each selected blockchain node, and the sum of the third numerical values and the weight of the third numerical value corresponding to each selected blockchain node; and sort the selected blockchain nodes in the election data received in this round according to the election scores from high to low, and determine the first predetermined number of blockchain nodes as consensus blockchain nodes, so that the consensus blockchain nodes sequentially perform block packaging operations according to predetermined rules in a new round.

8. The apparatus according to claim 7, wherein the consensus module is configured to count a sum of the second numerical values and a sum of the third numerical values in the election data received in this round; and determine a weight of the second numerical value and a weight of the third numerical value to satisfy that a product of the sum of the second numerical values and the weight of the second numerical value is equal to a product of the sum of the third numerical values and the weight of the third numerical value.

9. The apparatus according to claim 7, wherein the consensus module is further configured to determine a fourth numerical value for each blockchain node that transmits election data, the fourth numerical value is equal to the sum of the third numerical values in the election data transmitted from the blockchain node in this round, and the fourth numerical value indicates a value decreased from the second account of the blockchain node; and transmit the fourth numerical value to other blockchain nodes, so that each blockchain node stores the fourth numerical value in its corresponding blockchain database.

10. The apparatus according to claim 7, wherein the consensus module is further configured to generate a non-repeated random number for each consensus blockchain node after determining a predetermined number of consensus block chain nodes, so that the consensus blockchain node sequentially performs a predetermined number of block packaging operations in an order of the corresponding random numbers in a new round.

11. An electronic device, comprising:

a memory having executable instructions, and a processor, and wherein the instructions, when executed by the processor, are configured to cause performance of the method according to claim 1.

12. A non-transitory computer-readable medium having stored executable instructions, the instructions, when executed by a processor system, configured to cause the processor system to at least:

receive election data, in a round, transmitted from a blockchain node having a first account balance and/or a second account balance, the election data comprising information about a blockchain node selected by the blockchain node that transmits the election data;

determine a consensus blockchain node from blockchain nodes selected by each election data based on the election data received in this round, so that the consensus blockchain node performs a block packaging operation in a new round, wherein a value in the first account of each blockchain node indicates a number of digital currencies that the blockchain node has, and a value in the second account of each blockchain node indicates a number of votes that the blockchain node has;

receive transaction information transmitted from a blockchain node;

determine a first numerical value, the first numerical value indicating a value added to the second account of a blockchain node being a provider of a transaction object corresponding to the transaction information;

transmit the first numerical value to other blockchain nodes, so that each blockchain node stores the first numerical value in its corresponding blockchain database;

determine whether the transaction object corresponding to the transaction information is a consumable resource or not; and monitor whether the transaction object corresponding to the transaction information is used up by a blockchain node being a purchaser of the transaction object corresponding to the transaction information or not wherein the consumable resource comprises network traffic data resources and/or computing power resources of a processor, wherein the monitoring of whether the transaction object corresponding to the transaction information is used up by a blockchain node being a purchaser of the transaction object corresponding to the transaction information or not comprises:

receipt of transaction feedback information transmitted from the blockchain node being the purchaser of the transaction object, and determine whether the transaction object is used up by the blockchain node based on the transaction feedback information or not; or acquire a usage log of the transaction object, and determine whether the transaction object is used up by the blockchain node being the purchaser of the transaction object based on the usage log or not.

13. The computer-readable medium according to claim 12, wherein:

the election data further comprises a second numerical value and/or a third numerical value, for the election data transmitted from each blockchain node, a sum of the second numerical values in the election data is not greater than the first account balance of the blockchain node, and a sum of the third numerical values in the election data is not greater than the second account balance of the blockchain node; and wherein the instructions are further configured to cause the processor system to:

acquire a weight of the second numerical value and a weight of the third numerical value; and wherein the determination of a consensus blockchain node from blockchain nodes selected by each election data based on the election data received in this round comprises:

counting of a sum of the second numerical values corresponding to each selected blockchain node in the election data received in this round, and a sum of the third numerical values corresponding to each selected blockchain node in the election data received in this round;

obtaining of an election score of each selected blockchain node according to the sum of the second numerical values and the weight of the second numerical value corresponding to each selected blockchain node, and the sum of the third numerical values and the weight of the third numerical value corresponding to each selected blockchain node; and sorting of the selected blockchain nodes in the election data received in this round according to the election scores from high to low, and determination of a first predetermined number of blockchain nodes as consensus blockchain nodes, so that the consensus blockchain nodes sequentially perform block packaging operations according to predetermined rules in a new round.

\* \* \* \* \*